(12) United States Patent
Johansson et al.

(10) Patent No.: US 8,060,748 B2
(45) Date of Patent: Nov. 15, 2011

(54) SECURE END-OF-LIFE HANDLING OF ELECTRONIC DEVICES

(75) Inventors: Petri Mikael Johansson, Bjärred (SE); Per Ståhl, Klagshamn (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 916 days.

(21) Appl. No.: 11/963,019

(22) Filed: Dec. 21, 2007

(65) Prior Publication Data

US 2009/0164800 A1    Jun. 25, 2009

(51) Int. Cl.
*H04L 9/32* (2006.01)
*G06F 15/16* (2006.01)
*G06F 7/00* (2006.01)

(52) U.S. Cl. ............. 713/176; 726/9; 713/170; 707/698
(58) Field of Classification Search ................... 713/176; 726/9; 707/698
See application file for complete search history.

(56) References Cited

U.S. PATENT DOCUMENTS

| | | | |
|---|---|---|---|
| 5,495,531 A | 2/1996 | Smiedt | |
| 5,659,595 A | 8/1997 | Chanu et al. | |
| 5,898,783 A | 4/1999 | Rohrbach | |
| 5,946,613 A | 8/1999 | Hayes, Jr. et al. | |
| 6,766,869 B2 * | 7/2004 | Brand et al. | 175/24 |
| 2002/0186845 A1 * | 12/2002 | Dutta et al. | 380/247 |
| 2004/0102183 A1 * | 5/2004 | Haub et al. | 455/411 |
| 2006/0262929 A1 * | 11/2006 | Vatanen et al. | 380/255 |
| 2008/0293397 A1 * | 11/2008 | Gajdos et al. | 455/420 |

FOREIGN PATENT DOCUMENTS

WO     2007/008916 A2    1/2007

* cited by examiner

*Primary Examiner* — Philip Chea
(74) *Attorney, Agent, or Firm* — Coats & Bennett, P.L.L.C.

(57) ABSTRACT

Methods and apparatus for verifying that an electronic device has been disabled are disclosed. An exemplary electronic device includes a communications interface, a secure memory, storing a secret key, and a cryptographic circuit configured to calculate a verification token from the secret key, using a first cryptographic operation. The cryptographic circuit is further configured to calculate an identification token from the verification token, using a second cryptographic operation. The cryptographic circuit is further configured to output the identification token in response to a first command received via the communications interface. The verification token is output to the communications interface only if a predetermined functionality of the electronic device has been disabled. The electronic device may further comprise a disabling circuit configured to disable the predetermined functionality in response to a disable command.

22 Claims, 6 Drawing Sheets

SECURE END-OF-LIFE HANDLING OF ELECTRONIC DEVICES

BACKGROUND

The present invention generally relates to electronic devices, and particularly relates to the use of cryptographic processing to verify that an electronic device has been disabled.

As marketplaces and regulatory regimes become more sensitive to the environmental impacts of the disposal of consumer products, mobile phone manufacturers and other makers of electronic devices are increasingly likely to have an economic stake in how their products are processed upon disposal. Regulations and/or market forces may require, for instance, that these manufacturers recycle components from devices that are no longer wanted.

In many situations, disposal, recycling, and other end-of-life handling of products is likely to be contracted to companies unrelated to the manufacturers. In a typical business model, these contracted companies may charge the device manufacturer on a per-device basis for processing discarded products. Especially in the mobile phone industry, where various "grey" markets have flourished from time to time, such a business model may encourage fraud, where a manufacturer is charged for handling of devices that were not actually processed or that were diverted to uses not authorized by the producer.

To counter such fraud, a manufacturer might require that the contracted company disposing the products provide a list of device-specific serial numbers, such as the International Mobile Equipment Identifiers (IMEI) used with mobile phones, corresponding to the disposed products. The phone producer may then validate the submitted identifiers against a list of produced units before authorizing payment to the contractor. However, this process does not prove that the devices were actually taken out of service.

SUMMARY

The methods and apparatus taught herein provide electronic device manufacturers with a novel approach to verifying that an electronic device has been disabled. An exemplary electronic device according to one or more embodiments of the invention includes a communications interface, a secure memory storing a secret key, and a cryptographic circuit. The cryptographic circuit is configured to calculate a verification token from the secret key, using a first cryptographic operation, such as a cryptographic hash function. The cryptographic circuit is further configured to calculate an identification token from the verification token, using a second cryptographic operation. The second cryptographic operation may in some embodiments be a cryptographic hash function. Due to the nature of many cryptographic operations, and hash functions in particular, reversing the operations to determine the secret key is computationally infeasible. The cryptographic circuit is further configured to output the identification token in response to a first command received via the communications interface. The verification token, however, is output to the communications interface only if a predetermined functionality of the electronic device has been disabled. In several embodiments, the electronic device further comprises a disabling circuit configured to disable the predetermined functionality in response to a disable command; the disabling circuit may in some embodiments comprise an electronic fuse that is permanently opened in response to the disable command.

Because the verification token is output only if the electronic device has been disabled, this token may be used to validate a request for payment for device handling. Accordingly, also disclosed herein is a system for verifying that an electronic device has been disabled. In one or more embodiments, the system includes a database that includes identification tokens corresponding to a plurality of electronic devices. Each of the identification tokens is cryptographically generated from a secret key in the corresponding electronic device. In practice, an identification token may be generated when an electronic device, as described above, is manufactured, and stored in the database for later use. The system further comprises a verification module, which is configured to receive a verification token cryptographically generated from the secret key in an electronic device. The verification module calculates a candidate identifier from the verification token, using a cryptographic operation, such as a hash function. Finally, the verification module compares the candidate identifier to one or more of the identification tokens in the database to determine whether the verification token is valid. If the verification token was produced by an electronic device as described above, it provides evidence that the electronic device was disabled.

Several variations of the above devices and systems are described. In addition, methods for verifying the disabling of an electronic device, such as may be carried out by one or more of the disclosed apparatus, are also disclosed. Of course, the present invention is not limited to the above features and advantages. Those skilled in the art will recognize additional features and advantages upon reading the following detailed description and viewing the accompanying drawings.

DETAILED DESCRIPTION

Figure 1:
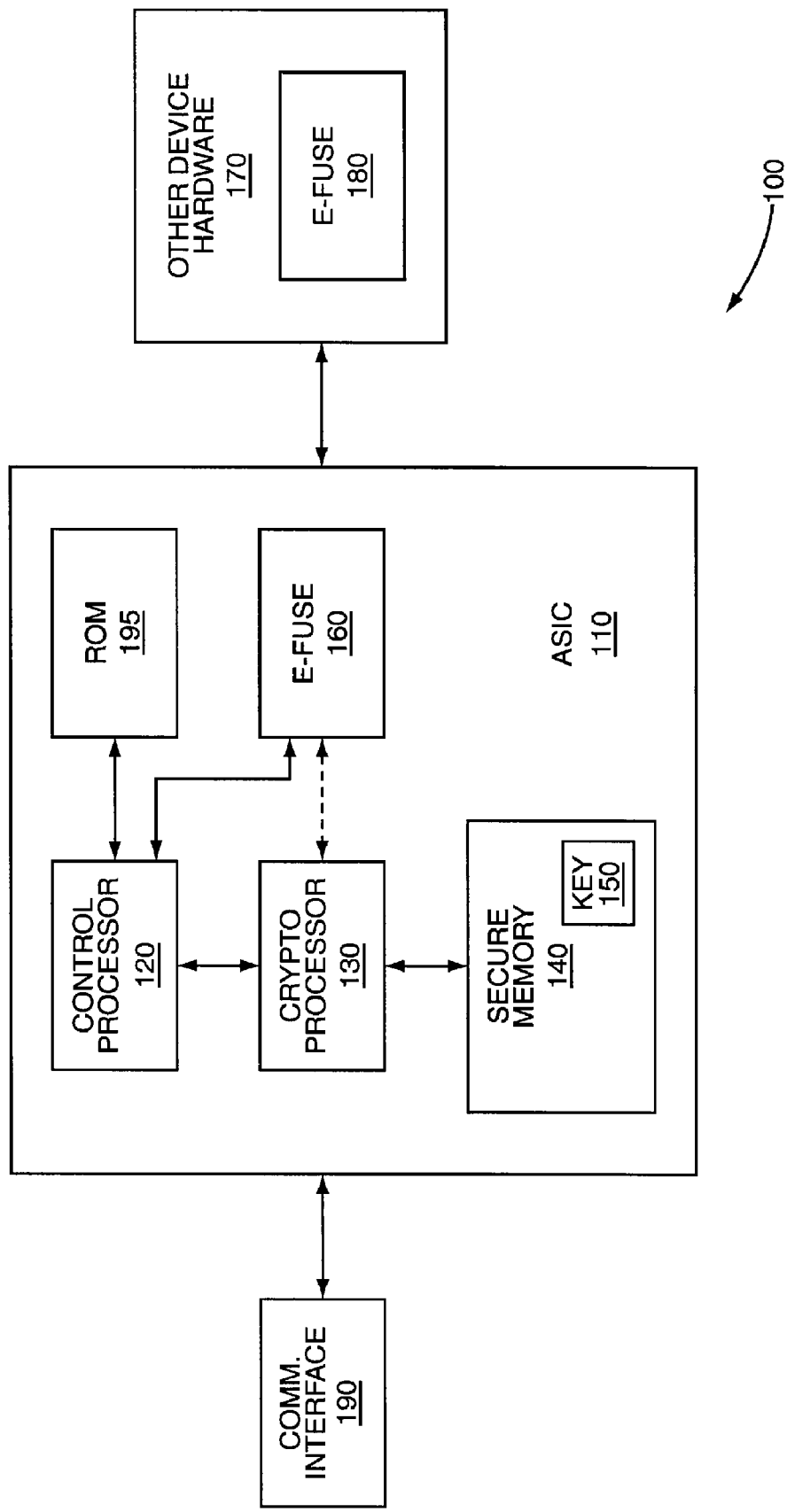
FIG. 1 is a block diagram of an electronic device according to one or more embodiments of the invention.

In much of the following discussion, the inventive techniques disclosed herein are explained with reference to mobile phones and mobile phone manufacturers. However, as those with skill in the art will readily appreciate, these inventive techniques are applicable to a wide variety of electronic devices and industries, and do not depend upon mobile phone-specific functionality. Thus, after reading the description and viewing the drawings, those with skill in the art will understand how to adapt any of a wide variety of electronic devices according to one or more of the disclosed embodiments.

Conveniently, many mobile phone devices include cryptographic processor functionality for various reasons. In some cases, the cryptographic processor is configured to prevent tampering with the device's embedded software. Similarly, many mobile phone devices include tamper-resistant memory. Those skilled in the art will understand that other devices may be adapted to include similar technology. However, those skilled in the art of cryptography and electronic security will appreciate that many security-related terms such as "tamper-resistant" or "secure" are inherently relative terms, since no device can be made perfectly tamper-resistant or perfectly secure. Yet, with the addition of more sophisticated (and, sometimes, more expensive) technology, virtually any device can be made more tamper-resistant or more secure. Accordingly, those skilled in the art will appreciate, for instance, that the term "secure memory" is used herein to refer to memory that is more secure than other memory on the same device, or more secure than corresponding memory on other similar devices. Thus, secure memory in some contexts might refer to a memory element within an electronic component that cannot be accessed externally, while in other contexts, secure memory may simply be protected by passwords or other authentication mechanisms.

In an embodiment of the present invention, two new functions are introduced into a mobile phone design. These new functions may conveniently be added to the mobile phone's so-called boot code, which is typically stored in read-only-memory (ROM). In many cases, the boot ROM may be part of a general processing application-specific integrated circuit (ASIC), often called the "baseband processor", making the contents of the boot ROM difficult to modify after manufacture. Together, these two functions may be used to generate a "claim ticket," for use in verifying that a mobile phone in question has been disabled. In the following, these two functions are called the "identifier" function and the "verifier" function.

The identifier function calculates and outputs a number r that is unique, or effectively unique, to the device. The value r may be calculated according to:

$$r = H(c), \qquad (1)$$

where $$c = MAC(K, \text{fixed\_string}). \qquad (2)$$

H(•) denotes a cryptographic hash function, such as the well-known SHA-256 algorithm, and MAC(•) denotes a message authentication code function, such as HMAC-SHA-256, calculated over a fixed (but not secret) data string fixed_string, using a secret key K. Secret key K is a device-specific key that cannot be read out from the hardware. Rather, it may only be accessed by the cryptographic processor, typically a hardware block, performing the MAC operation. Typically, the key value is set when producing the host ASIC, often using electronic fuses ("E-fuses") to store the key value. For optimal security, the value of K for a given device is unknown after manufacture, even by the manufacturer. Further, the secret key is optimally stored in a memory that cannot be accessed from outside the ASIC.

In any event, since K is device-specific, r also becomes device-specific. The size of r depends on the choice of hash function H(•). For SHA-256, the size of r is 256 bits. Those skilled in the art will appreciate that values for r will generally differ from one device to another (assuming that the devices have different keys), due to the properties of cryptographic hashing functions. True uniqueness is not guaranteed with many hashing operations. However, true uniqueness across a population of devices is not required. Rather, the most important properties of the operations chosen to produce r are that the values generated from two different values of K are very unlikely to be the same, and that the operations are effectively irreversible. In other words, it should be very difficult, preferably computationally infeasible even given extreme processing power, to derive the value of the secret key K from a known value for r.

As noted above, the identifier function may be implemented as a boot ROM function. Typically, the identifier function may be triggered by connecting the mobile phone (or other electronic device) to a computer, using a communications interface such as a Universal Serial Bus (USB) interface or a universal asynchronous receiver/transmitter (UART). In some embodiments, the identifier function may be invoked any number of times, including after the device is in the field. In other instances, however, access to the identifier function might be restricted, perhaps through the use of passwords, hardware keys, or the like. In any event, although the identifier function produces the value r as an output, intermediate results are not accessible outside the cryptographic circuitry, which is typically embedded inside an ASIC. In particular, the intermediate value c produced by Equation (2) above is not accessible outside the cryptographic circuit.

In contrast to the identifier function, which may typically be executed when a device is first manufactured, the verifier function is used when or after the device is disabled or otherwise taken out of service. Like the identifier function, the verifier function may be implemented as a boot ROM function that can be triggered by a command sent from an external PC over a communications interface.

In some embodiments, the first triggering of the verifier function also triggers a disabling process. For instance, the verifier might cause one or more e-fuses to be "burned," or permanently opened. These e-fuses may be connected to vital parts of the baseband ASIC of a mobile phone, for example, or may be connected to radio hardware, graphics hardware, or the like. In any case, when the one or more e-fuses are burned, the device is rendered useless. In various embodiments, substantially all of a device's functionality may be disabled, while in others only enough functionality need be disabled so as to make the device of low value. The exception, of course, is that the verifier function itself remains operational, for at least long enough to produce the verification token as described below.

Besides burning the fuse or otherwise disabling the device, the verifier function also calculates and returns a verification token c. Like r, the value of c should generally be unique to each device, or at least very unlikely to be duplicated. The value c is calculated according to Equation (1) above, i.e., $$c = MAC(K, \text{fixed\_string}).$$

Accordingly, the verification token c is the same value calculated as an intermediate value in the calculation of the identification token r described above. The size of c depends on the choice of MAC function. For HMAC-SHA-256, c is 256 bits.

The verifier function can be called any number of times to read out the value c, but the e-fuse is only burned the first time the function is called. Those skilled in the art will appreciate that separate commands may be used to disable the device and to trigger the generation of the verification token. In this case, the disable command may or may not also produce and output the verification token. Furthermore, the command for generating the verification token must only be operable after the device has been disabled.

In addition to the identification tokens and verification tokens described above, an additional (non-secret) serial number may be associated with the electronic device. This may be an International Mobile Equipment Identifier (IMEI), such as is commonly used with mobile phones, or any other device-specific number. This serial number may be printed on the device, or on a device label, or may be electronically accessible via the communications interface. For example, the serial number might be read from the device by communicating with the boot ROM via a USB or UART interface, using yet another command. Alternatively, the serial number might be output along with the verification token or the identification token in response to the verifier function or identifier functions.

In one approach to verifying that an electronic device has been disabled, the device producer executes the identifier function during production of the device, thus obtaining the value r, and stores r in a database. In some instances, the serial number for the device (IMEI, or the like) may be stored in the database as well, for easy retrieval of the r-value corresponding to a particular device. When devices are taken out of service, a disposal contractor may execute both the identifier function and the verifier function to obtain the values c and r for each device. To present a claim for payment to the device producer, the contractor provides a list of claim tickets, one for each destroyed device. The claim ticket comprises at least the verification token c, and may also include the identification token r and/or the serial number.

To verify the claim, the device producer may perform one or more of the following checks. First, in the event that the database includes the device serial number as well as the identification token r, the producer may compare the r-value and serial number paired in the database to the submitted pair. Second, the producer calculates a candidate identifier r' from the submitted verification token c, using the same cryptographic operation implemented in the device. Thus, for the present example, $$r'=H(c). \quad (3)$$

The candidate identifier r' is compared with the identification token r stored in the database to check for a match.

Those skilled in the art will appreciate that the latter check ensures that the verifier function has been executed by the contractor, since it is computationally infeasible to calculate a value c that fulfills r=H(c) for a known r. The first check ensures that the contractor does not attempt to re-submit (c,r) pairs from other destroyed units. Those skilled in the art will appreciate that checking the serial number is not strictly necessary, however. As an alternative, for instance, r-values stored in the database may be deleted, or marked as used, after a claim. Thus, subsequent claims corresponding to the same verification token will be denied. (In the rare case where two devices are manufactured having the same identification token value, the database can be adjusted accordingly.)

Those skilled in the art will appreciate that it will typically be important that the disabling function can only be executed in a controlled environment. One means for limiting access to the disabling function to authorized personnel is to activate the disabling function only when the device is activated in a special service mode. Enabling the service mode may involve authentication over the communications interface, perhaps using software-based authentication or a hardware key. For instance, a standard authentication protocol may be wrapped around any of the disabler, verifier, or identification functions, using a shared symmetric key or using public-private key pairs and digital signatures.

With the preceding general description in mind, FIG. 1 provides a block diagram for an electronic device configured according to one or more embodiments of the present invention. Electronic device 100 comprises an ASIC 110, which includes a control processor 120, a cryptographic processor 130, and a secure memory 140, which includes a secret key 150. ASIC 110 also includes an e-fuse 160, which may be used to disable pre-determined functionality in electronic device 100, and read-only memory (ROM) 195. Electronic device 100 also includes other device hardware 170—in a mobile phone, for example, other device hardware 170 might include radio hardware, graphics display hardware, and so on. As pictured, other device hardware 170 also includes an additional e-fuse 180, which may be used to disable all or a portion of the other device hardware 170. Finally, electronic device 100 comprises a communications interface 190. This may be a user-accessible interface, such as a USB or serial interface used to connect the electronic device 100 to a personal computer. Alternatively, this may be an interface intended only for use by the manufacturer and authorized service personnel.

In the embodiment pictured in FIG. 1, control processor 120 may be a standard or customized microprocessor element executing software stored in program memory (which may include ROM 195 as well as other memory elements not shown in FIG. 1). In some embodiments, control processor 120 may be dedicated to security functions of electronic device 100. In others, however, control processor 120 provides control for other functions of the electronic device 100. For example, in some embodiments control processor 120 may comprise the primary baseband processor for a mobile phone.

In some embodiments, cryptographic processor 130 comprises dedicated hardware designed for a high degree of tamper-resistance and security. In other, perhaps less secure, implementations, cryptographic processor 130 may be implemented using a software-based microcontroller or processor. Those skilled in the art will appreciate the security and cost tradeoffs implicit in various implementations of cryptographic processor 130.

Similarly, secure memory 140 may comprise one-time programmable memory embedded in ASIC 110 and accessible only to a hardware-based cryptographic processor 130, or it may comprise ROM or flash memory that is encrypted, scrambled, or otherwise rendered reasonably secure. Again, those skilled in the art will appreciate that various approaches may yield dramatically different levels of security, but that the level of security actually needed for a particular device may vary, depending on the economics involved. In any event, secret key 150, stored in secure memory 140, should generally be accessible only to cryptographic processor 130.

In some embodiments, e-fuse 160 is burned, or opened, in response to a disable command received over communications interface 190. The burning of e-fuse 160 may be under the control of control processor 120 or under the control of cryptographic processor 130. In some embodiments, the disable command may be inoperative unless authenticated with a symmetric key, a digital signature, or the like. In these embodiments, control processor 120 may be configured to authenticate the disable command, using cryptographic operations provided by cryptographic processor, before burning e-fuse 160.

In some embodiments, e-fuse 160 is entirely internal to ASIC 110, i.e., not connected to any pins or probe points, to prevent tampering. In various embodiments, the status of e-fuse 160 is checked by an initialization routine initiated by powering up electronic device 100, so that a pre-determined functionality of electronic device 100 is rendered inoperable if the e-fuse is burned. In some cases, this initialization routine is performed by a boot ROM program, e.g., an initialization routine performed by control processor 120 executing firmware contained in ROM 195.

As mentioned above, some embodiments might include an e-fuse 180 external to the ASIC 110. In such embodiments, it may be more difficult to ensure that the device has actually been disabled, as a device with an external e-fuse 180 may be more vulnerable to tampering. In some embodiments, then, communication between ASIC 110 and other device hardware 170 related to confirming the disabling of other device hardware 170 may be integrity protected, using, for example, a shared secret, to make it more difficult for a confirmation routine to be spoofed.

In one or more embodiments, electronic device 100 is configured to provide an identification token and a verification token for use in verifying that the electronic device 100 is properly disabled by a disposal contractor. In particular, control processor 120 and cryptographic processor 130 may be configured, e.g. programmed, to carry out the methods illustrated in FIGS. 2-4.

Figure 2:
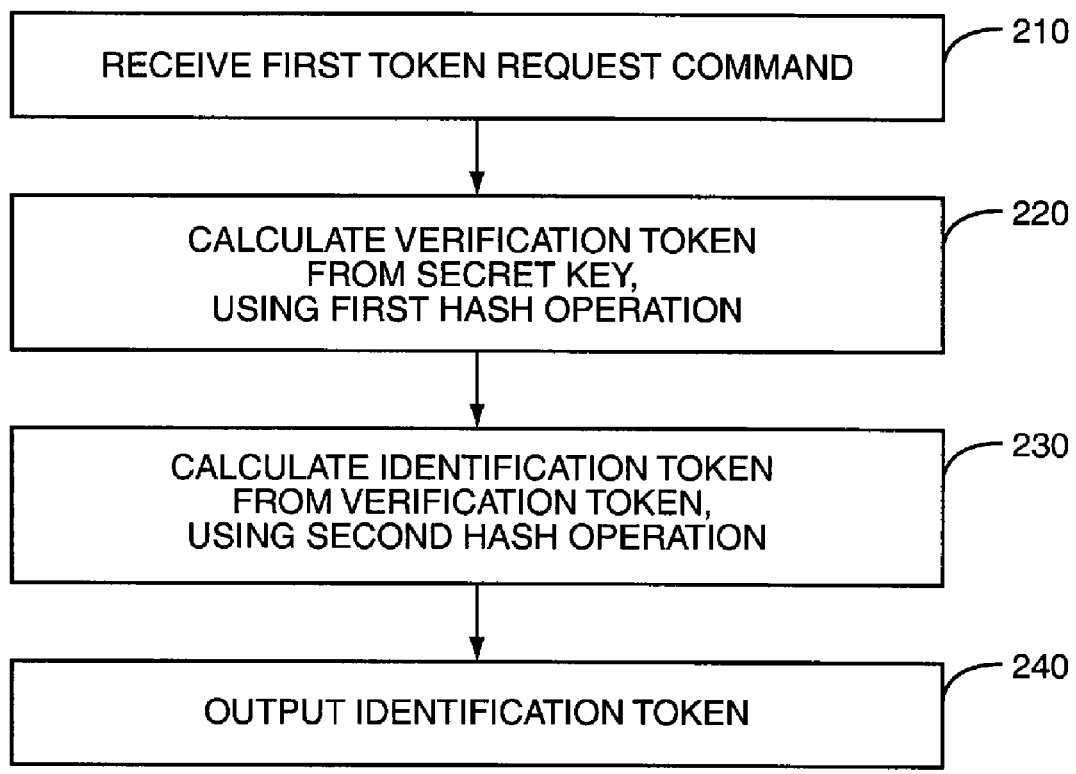
FIG. 2 is a flow diagram illustrating an exemplary method for generating an identification token.

FIG. 2 illustrates a general method for generating an identification token according to one or more embodiments of the present invention. The method of FIG. 2 is described here in reference to electronic device 100, although those skilled in the art will appreciate the applicability of the disclosed method to devices of various configurations.

At block 210, electronic device 100 receives a first token request command. In some embodiments, this command may be a command specifically designed for retrieving the identification token from the device. In others, this command may trigger the outputting of other data from electronic device 100, or the performance of other functions.

In any event, in response to the first token request command, a verification token is calculated from a secret key, using a first hashing operation. In some embodiments, such as the electronic device 100 pictured in FIG. 1, the verification token is calculated by cryptographic processor 130, using the secret key 150 stored in secure memory 140. In several embodiments, the hashing operation comprises or is based upon the SHA family of hashing algorithms. In some embodiments, a MAC function is used, wherein a fixed string is used as an input parameter along with secret key 150.

The verification token resulting from the calculation of block 220 is an intermediate value that is output only under certain circumstances, as will be described further. This intermediate value is used at block 230, where an identification token is calculated from the verification token, using a second hashing operation. In some embodiments, the second hashing operation may be the same as the first. In others, a different operation may be employed. For instance, in some embodiments, a MAC algorithm, such as the HMAC-SHA-256 algorithm, may be employed for the first operation at block 220, while the SHA-256 hash algorithm is used for the second operation, at block 230.

At block 240, the identification token is output. In practice, the first token request command may be executed when electronic device 100 is first manufactured, perhaps as part of a final testing procedure. The device manufacturer may then store the retrieved identification token in a database, for later use in validating a claim that the corresponding electronic device 100 has been disabled.

Figure 3:
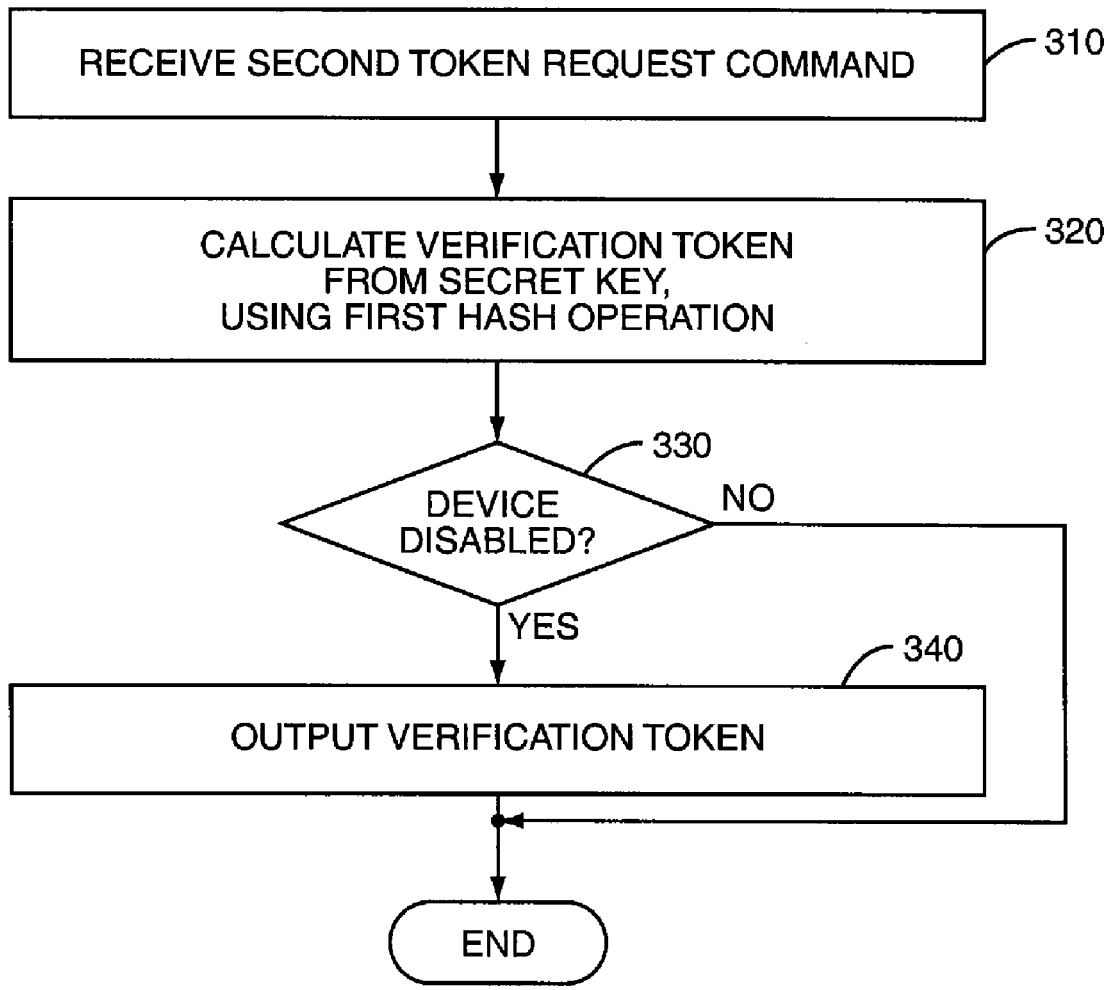
FIG. 3 is a flow diagram illustrating an exemplary method for generating and outputting a verification token.

At FIG. 3, a method is illustrated for generating a verification token for use in making such a claim. At block 310, a second token request command is received. Again, this second token request command may be a command specially designed for retrieving the verification token, and may have no other purpose. However, in several embodiments, the second token request command may trigger the retrieval of other data, or trigger other functions. For instance, in several embodiments the second token request command may also trigger the disabling of electronic device 100.

In any case, in response to the second token request command, the verification token is calculated from the secret key, using the first hash operation, at block 320. The calculation step of block 320 is essentially identical to the calculation step of 220. However, here the verification token is not simply an intermediate value, but may be output, under appropriate circumstances, to verify that the electronic device 100 has been disabled. Thus, the status of electronic device 100 is checked, at block 330. If the device has not been disabled, then outputting of the verification token is not permitted, and the method ends. If electronic device 100 has been disabled, on the other hand, the verification token is output at block 340. As explained above, the verification token may be submitted as evidence that the corresponding device has been disabled.

Those skilled in the art will appreciate that the status check of block 330, in which it is determined whether or not the electronic device 100 has been disabled, may be performed prior to the calculation of block 320. In this case, the calculation of the verification token may be avoided entirely if the device has not been disabled. However, in some embodiments the same command format may be used to retrieve both the identification token and the verification token. In these embodiments, the command will trigger the output of the verification token only if electronic device 100 has been disabled. But, the calculation of the verification token may still be required, in these applications, to generate and output the identification token.

Figure 4:
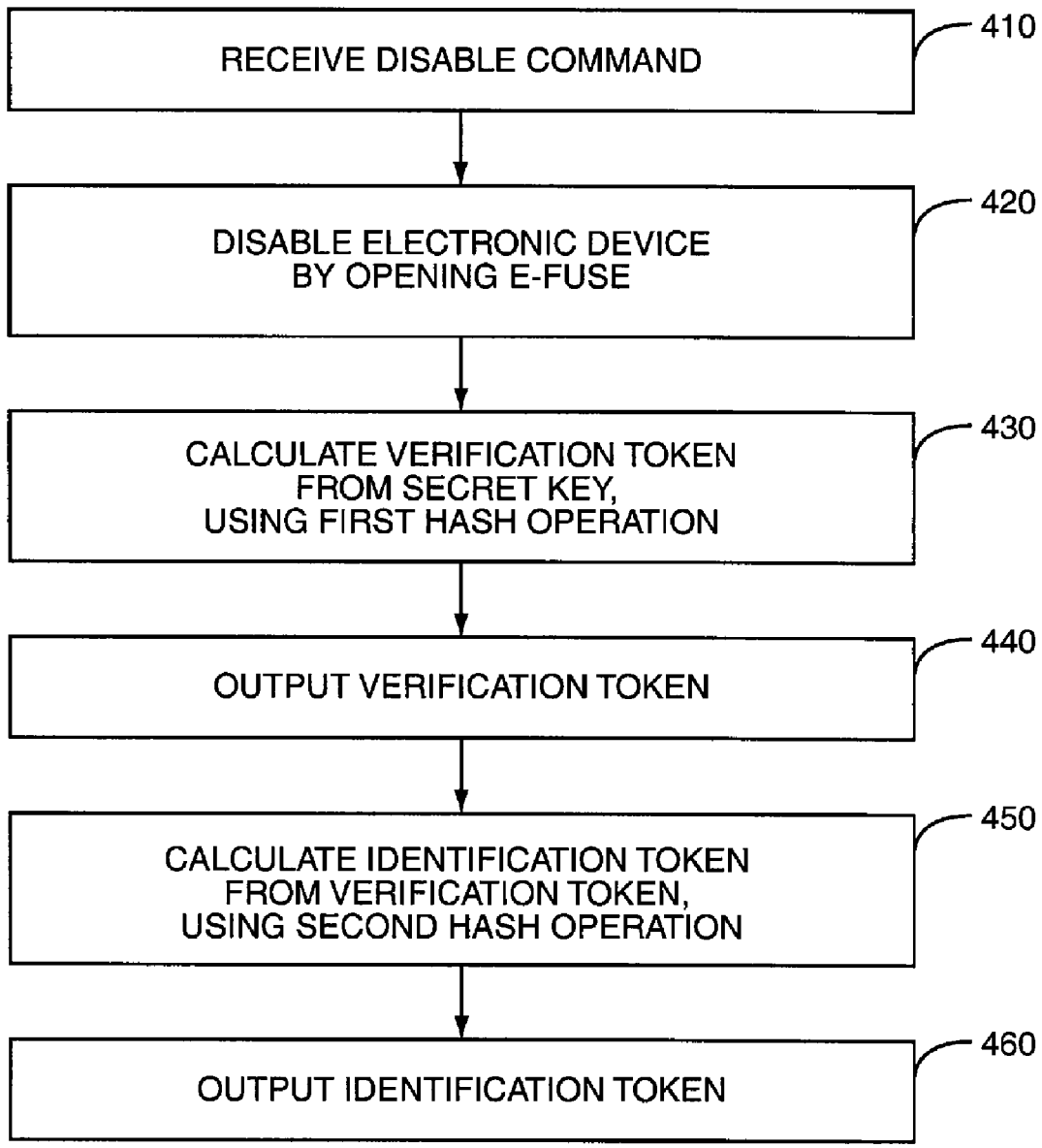
FIG. 4 is a flow diagram illustrating a method for disabling an electronic device and generating and outputting a verification token and an identification token, according to an embodiment of the invention.

FIG. 4 illustrates an exemplary method for disabling an electronic device 100. At block 410, a disable command is received. Because this command may result in permanent disabling of the device, the disable command may be preceded or followed by any of a number of authentication procedures, to prevent unauthorized disabling of the device. For instance, the disable command may only be operative in a special operating mode of the electronic device 100, which mode may only be entered by operating the electronic device in conjunction with a hardware key, and/or by performing an authentication procedure, such as with a digitally signed message.

At block 420, electronic device 100 is disabled, in response to the disable command, by opening an electronic fuse. In some embodiments, a single electronic fuse may be used, such as e-fuse 160 of FIG. 1. In others, multiple e-fuses may be employed, including e-fuse 180 of FIG. 1. In still other embodiments, other mechanisms for disabling electronic device 100 may be employed, either instead of or in addition to the burning of an electronic fuse. For instance, in some embodiments, all or a portion of program code stored in program memory may be erased or overwritten. In some embodiments, initialization parameters and/or security parameters may be deleted or modified, to prevent operation of the device.

In the embodiment illustrated in FIG. 4, receipt of the disable command not only triggers the disabling of the device, but also triggers the calculation of the verification token. In several such embodiments, the disable command may thus be used more than once—only the first receipt triggers the disabling of the device, but subsequent disabling commands may be used to generate and output the verification token and, in some embodiments, the identification token. Thus, at block 430, the verification token is calculated from the secret key 150, using the first hashing operation, and output at block 440. This process is the same as described in FIG. 3. In some embodiments, the identification token is also produced in response to the disable command. This may be desirable to support a system in which the verification token and the identification token must both be submitted to claim reimbursement for handling the disposal of the electronic device 100. Accordingly, the identification token is calculated from the verification token, using the second hash operation, at block 450, and output at block 460.

Figure 5:
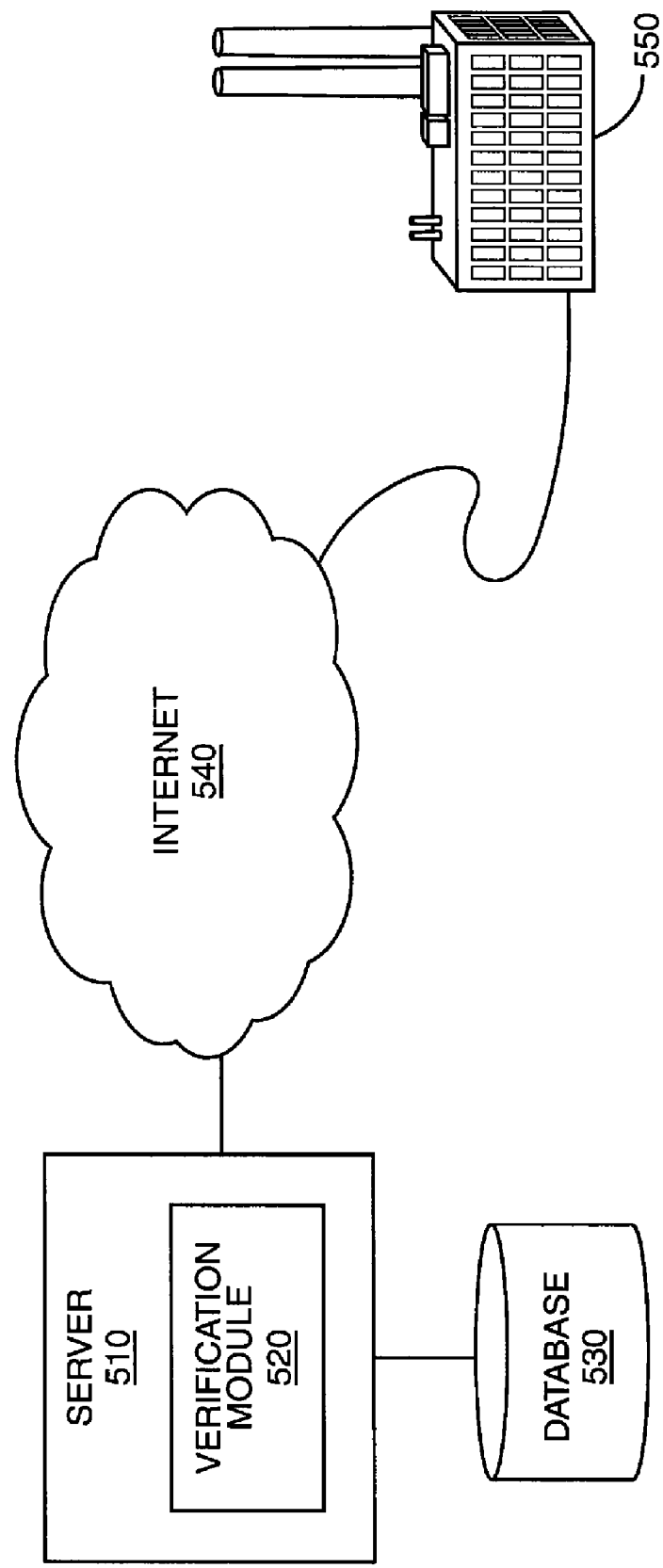
FIG. 5 illustrates a system for verifying the disabling of an electronic device, according to an embodiment of the invention.

FIG. 5 illustrates a system for verifying the disabling of an electronic device, using the identification and verification tokens described above. The system includes a server 510, including a verification module 520, connected to a database 530. The database 530 stores identification tokens corresponding to manufactured electronic devices 100; these identification tokens may be collected from the electronic devices 100 using the methods described above. In some embodiments, the identification tokens are stored in association with serial numbers, such as an IMEI for a mobile phone.

In the system of FIG. 5, server 510 is connected to the Internet 540, facilitating electronic processing of claims from disposal contractors, such as disposal contractor 550. After disabling one or more electronic devices 100 according to the methods described above, disposal contractor 550 submits an electronic claim form to server 510, via Internet 540. This electronic claim form includes at least the verification token corresponding to each processed electronic device 100. In some embodiments, the electronic claim form may also include one or both of the identification token and a serial number for each device. These may be used, for example, by the verification module 520 in retrieving the stored record in database 530 corresponding to the electronic device 100.

The verification module 520, which may simply be an application running on server 510, is configured to process the verification tokens received from disposal contractor 550. Thus, in some embodiments, verification module 520 calculates a candidate identifier from the received verification token, using a cryptographic operation, to obtain a candidate identifier. Those skilled in the art will appreciate that the cryptographic operation here is identical to the operation employed in electronic device 100 to convert the verification token to an identification token. Next, verification module 520 compares the candidate identifier to one or more of the identification tokens stored in database 530 to determine whether the verification token is valid. In embodiments where a serial number is submitted along with the verification token, the serial number may be used to retrieve the corresponding identification token from database 530 for comparison with the candidate identifier. In other embodiments, however, database 530 may simply be searched to determine whether it contains an identification token matching the candidate identifier.

If the candidate identifier matches a valid identification token, then the submitted claim that the corresponding electronic device 100 was disabled may be presumed valid. As applicable, verification module 520 may be configured to render payment or credit for the claim. In some embodiments, verification module 520 may be further configured to delete the corresponding identification token from the database 530, or to add a flag indicating that a claim has been submitted for the corresponding device. Either of these approaches may be applied to prevent subsequent validations of a claim for the same verification token.

Figure 6:
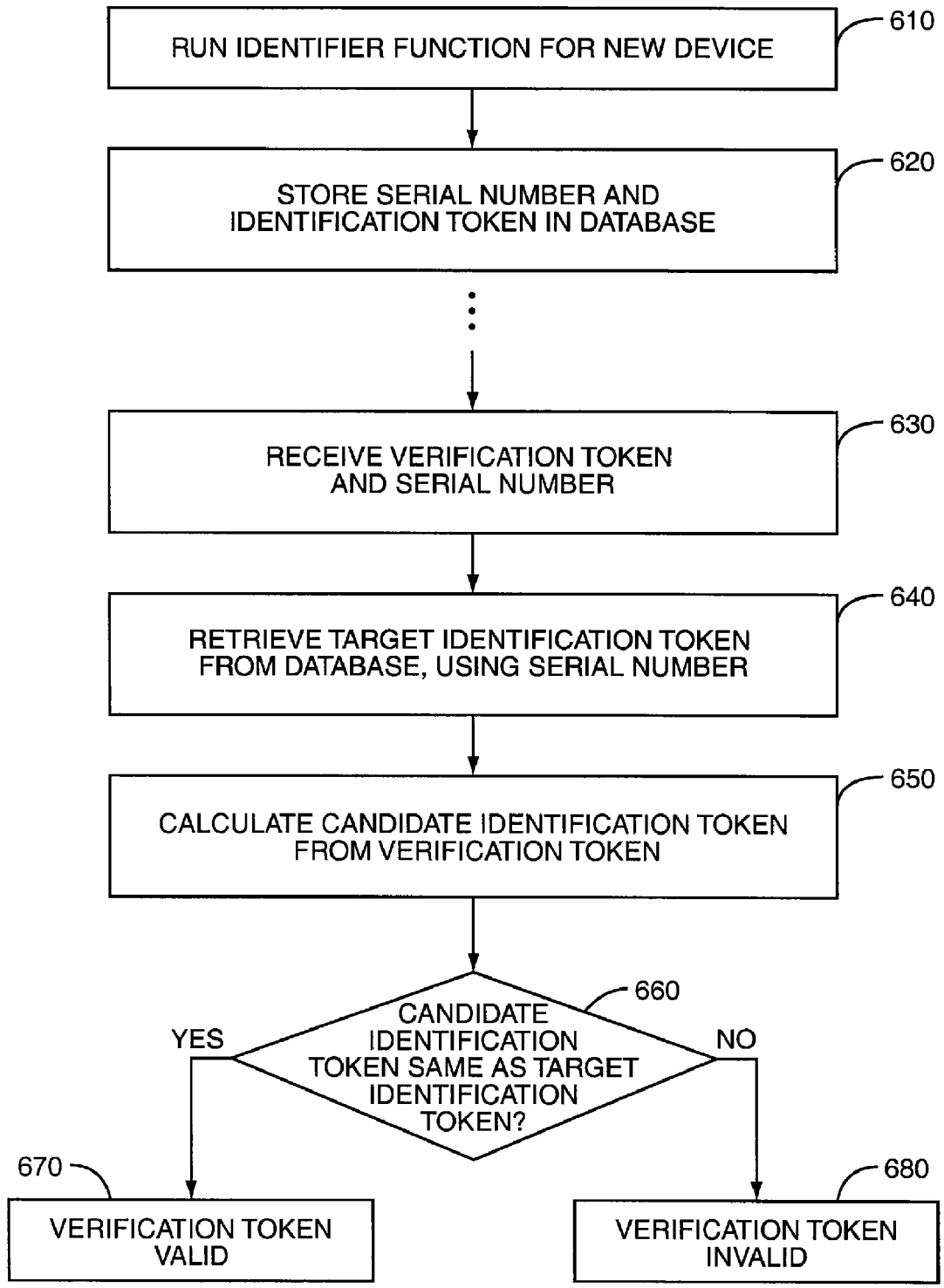
FIG. 6 is a flow diagram illustrating an exemplary method for verifying that an electronic device has been disabled, such as might be implemented with the system of FIG. 5.

An end-to-end view of one embodiment of a method for verifying proper handling of electronic devices 100, from the perspective of the device producer, is illustrated at FIG. 6. At block 610, an identifier function is executed for a newly produced electronic device 100. This function, which may be an implementation of the method illustrated in FIG. 2, returns an identification token that is effectively unique to the electronic device 100. At 620, this identification token is stored in database 530, along with a serial number for the corresponding electronic device 100.

Later, at the end of life for the electronic device 100, a claim is submitted to verification module, including a verification token and a serial number, as shown at block 630. At block 640, verification module 520 retrieves a target identification token from database 530, using the serial number. Next, verification module 520 calculates a candidate identifier from the receiving verification token, using the appropriate cryptographic operation, to obtain a candidate identifier, as shown at block 650. The calculated candidate identifier is compared to the target identification token at block 660. If the values match, the submitted verification token is valid, as shown at block 670. If not, the verification token is invalid, as illustrated at block 680.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. An electronic device, comprising:
a communications interface;
a secure memory storing a secret key; and
a cryptographic circuit, operatively coupled to the secure memory and the communications interface and configured to
   (a) calculate a verification token from the secret key, using a first cryptographic operation,
   (b) calculate an identification token from the verification token, using a second cryptographic operation,
   (c) output the identification token to the communications interface, responsive to a first command received via the communications interface, and
   (d) output the verification token to the communications interface, responsive to a second command received via the communications interface, only if a predetermined functionality of the electronic device has been disabled.

2. The electronic device of claim 1, further comprising a disabling circuit configured to disable the predetermined functionality of the electronic device in response to a disable command received via the communications interface.

3. The electronic device of claim 2, wherein the cryptographic circuit is configured to output the verification token in response to the disable command.

4. The electronic device of claim 2, wherein the disabling circuit comprises at least one electronic fuse, wherein the electronic fuse is opened in response to the disable command.

5. The electronic device of claim 1, wherein the first or second cryptographic operation, or both, comprises a cryptographic hash function.

6. The electronic device of claim 1, wherein the first or second cryptographic operation, or both, comprises a cryptographic message authentication code (MAC) function.

7. The electronic device of claim 1, wherein the cryptographic circuit is configured to calculate the verification token from the secret key and a predetermined data string, using a cryptographic message authentication code (MAC) function, and wherein the cryptographic circuit is configured to calculate the identification token from the verification token using a cryptographic hash function.

8. A method for verifying disabling of an electronic device, comprising:

calculating a verification token from a secret key stored in the electronic device, using a first cryptographic operation;

calculating an identification token from the verification token, using a second cryptographic operation; and outputting the identification token from the electronic device, responsive to a first command; and outputting the verification token from the electronic device, responsive to a second command, only if a predetermined functionality of the electronic device has been disabled.

9. The method of claim 8, further comprising disabling the predetermined functionality of the electronic device in response to a disable command.

10. The method of claim 9, wherein the second command is the disable command.

11. The method of claim 9, wherein disabling the predetermined functionality of the electronic device comprises opening at least one electronic fuse.

12. The method of claim 8, wherein the first or second cryptographic operation, or both, comprises a cryptographic hash function.

13. The method of claim 8, wherein the first or second cryptographic operation, or both, comprises a cryptographic message authentication code (MAC) function.

14. The method of claim 8, wherein calculating the verification token comprises calculating the verification token from the secret key and a predetermined data string, using a cryptographic message authentication code (MAC) function, and wherein calculating the identification token comprises calculating the identification token from the verification token using a cryptographic hash function.

15. A system for verifying that an electronic device has been disabled, comprising:
   a database storing identification tokens corresponding to a plurality of electronic devices, wherein each identification token is cryptographically generated from a secret key in the corresponding electronic device; and
   a verification module connected to the database and comprising a processor configured to
      (a) receive a verification token cryptographically generated from the secret key in one of the plurality of electronic devices,
      (b) calculate a candidate identifier from the verification token, using a cryptographic operation, and
      (c) compare the candidate identifier to one or more of the identification tokens to determine whether the verification token is valid.

16. The system of claim 15, wherein the cryptographic operation comprises a cryptographic hash function.

17. The system of claim 15, wherein the cryptographic operation comprises a cryptographic message authentication code (MAC) function.

18. The system of claim 15, wherein the verification module is further configured to:
   receive a serial number corresponding to the one of the plurality of electronic devices;
   retrieve a target identification token from the database of identification tokens, using the serial number; and
   compare the candidate identifier to the target identification token to determine whether the verification token is valid.

19. A method for verifying that an electronic device has been disabled, comprising:
   receiving a verification token cryptographically generated from a secret key in one of a plurality of electronic devices;
   calculating a candidate identifier from the verification token, using a cryptographic operation; and
   comparing the candidate identifier to one or more of a plurality of stored identification tokens corresponding to the plurality of electronic devices, wherein each identification token is cryptographically generated from the secret key in the corresponding electronic device, to determine whether the verification token is valid.

20. The method of claim 19, wherein the cryptographic operation comprises a cryptographic hash function.

21. The method of claim 19, wherein the cryptographic operation comprises a cryptographic message authentication code (MAC) function.

22. The method of claim 19, further comprising:
   receiving a serial number corresponding to the one of the plurality of electronic devices; and
   retrieving a target identification token from the database of stored identification tokens, using the serial number;
wherein comparing the candidate identifier to one or more of a plurality of stored identification tokens comprises comparing the candidate identifier to the target identification token to determine whether the verification token is valid.

* * * * *